(12) United States Patent
Zhu et al.

(10) Patent No.: US 10,760,756 B2
(45) Date of Patent: Sep. 1, 2020

(54) CONDENSER FOR LOW-BEAM VEHICLE LIGHT MODULE

(71) Applicant: H.A. AUTOMOTIVE SYSTEMS, INC., Wuhan (CN)

(72) Inventors: He Zhu, Wuhan (CN); Zhiping Qiu, Wuhan (CN)

(73) Assignee: H.A. AUTOMOTIVE SYSTEMS, INC., Wuhan (CN)

( * ) Notice: Subject to any disclaimer, the term of this patent is extended or adjusted under 35 U.S.C. 154(b) by 0 days.

(21) Appl. No.: 16/734,314

(22) Filed: Jan. 4, 2020

(65) Prior Publication Data
US 2020/0182423 A1  Jun. 11, 2020

Related U.S. Application Data

(62) Division of application No. 16/068,647, filed on Jul. 6, 2018, now Pat. No. 10,563,832.

(51) Int. Cl.
| | | |
|---|---|---|
| *F21S 41/141* | (2018.01) | |
| *G02B 19/00* | (2006.01) | |
| *F21S 41/30* | (2018.01) | |
| *F21S 41/20* | (2018.01) | |
| *F21S 41/32* | (2018.01) | |
| *F21S 41/143* | (2018.01) | |
| *F21S 41/27* | (2018.01) | |
| *F21W 102/18* | (2018.01) | |

(Continued)

(52) U.S. Cl.
CPC ............ *F21S 41/141* (2018.01); *F21S 41/143* (2018.01); *F21S 41/27* (2018.01); *F21S 41/285* (2018.01); *F21S 41/30* (2018.01);

*F21S 41/322* (2018.01); *G02B 19/0028* (2013.01); *G02B 19/0061* (2013.01); *G02B 19/0066* (2013.01); *F21W 2102/13* (2018.01); *F21W 2102/18* (2018.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2006/0087860 | A1* | 4/2006 | Ishida | F21S 43/243 362/517 |
| 2016/0053967 | A1* | 2/2016 | Owada | F21V 13/04 362/520 |
| 2017/0130923 | A1* | 5/2017 | Nishimura | F21S 41/27 |

(Continued)

*Primary Examiner* — Elmito Breval
(74) *Attorney, Agent, or Firm* — CBM Patent Consulting, LLC

(57) ABSTRACT

A condenser for a low-beam vehicle light module comprises light condensing structures, a cut-off line forming structure, a 50L dark area forming structure, a zone III forming structure and an SEG10 luminance reducing structure. The zone III forming structure comprises a zone III breadth forming structure and an HV luminance reducing structure. The cut-off line forming structure is disposed at a front end of the condenser. The SEG10 luminance reducing structure is disposed at the bottom of the condenser. The zone III forming structure is disposed at the bottom of the condenser and is located at a front end of the SEG10 luminance reducing structure. The 50L dark area forming structure is disposed at the bottom of the condenser and is located between the zone III forming structure and the cut-off line forming structure.

9 Claims, 8 Drawing Sheets

(51) Int. Cl.
 *F21Y 115/10* (2016.01)
 *F21W 102/13* (2018.01)

(56) References Cited

U.S. PATENT DOCUMENTS

| | | | |
|---|---|---|---|
| 2017/0184267 A1* | 6/2017 | Courcier | G02B 6/0065 |
| 2018/0058651 A1* | 3/2018 | Gromfeld | F21S 41/24 |
| 2018/0087745 A1* | 3/2018 | Gromfeld | F21V 5/04 |

* cited by examiner

CONDENSER FOR LOW-BEAM VEHICLE LIGHT MODULE

This application is the divisional application of U.S. patent Ser. No. 16/068,647 that is the U.S. national phase of International Application No. PCT/CN2017/074195 filed on 21 Feb. 2017 which designated the U.S. and claimed priority to Chinese Application Nos. CN201610866450.8 and CN201621094737.5 filed on 30 Sep. 2016, the entire contents of each of which are hereby incorporated by reference.

BACKGROUND OF THE INVENTION

Technical Field

The invention relates to vehicle lights, in particular to a condenser for a low-beam vehicle light module.

Description of Related Art

At present, LED light sources have been maturely applied to low-beam vehicle light modules. Although various low-beam vehicle light modules provided with LED light sources have been in existence, these low-beam vehicle light modules have the development tendency of small size, simple structure, low cost and high performance and can be greatly developed on these aspects. Vehicle light modules with the above characteristics have extremely great market potential.

The condenser for existing vehicle light modules is generally provided with a single light condensing structure. In order to form a low-beam light shape conforming to specific laws and regulations such as ECE R123 Class C, V and E, parts such as light shields have to be adopted, resulting in the defect of complex structure.

In order to conform to specific laws and regulations, the existing vehicle light modules have to be provided with tens of LED light sources, and part of the LEDs are controlled to be turned on or off to change the luminance of a specific zone in the low-beam light shape, which results in a high cost and large space of the existing vehicle light modules due to the great number of LEDs.

Therefore, the following technical problems are urgently to be solved in this field. The existing vehicle light modules with condensers are low in integration level, light shields are still used to form cut-off lines and to reduce the luminance of certain zones, and consequentially, the existing vehicle light modules are complex in structure and large in size. Or a large number of LEDs are turned on or off to control luminance changes of a specific zone in the low-beam light shape, inevitably resulting in a high cost. The large number of LEDs and light condensing structures result in the large sizes of the modules.

BRIEF SUMMARY OF THE INVENTION

To solve the above problems, the prevent invention aims to provide a condenser for a low-beam vehicle light module. The technical scheme of the condenser for the low-beam vehicle light module is as follows:

the condenser for the low-beam vehicle light module comprises light condensing structures 1, a cut-off line forming structure 2, a 50L dark area forming structure 3, a zone III forming structure 4, a SEG10 luminance reducing structure 5 and condenser installation structure 6, and is characterized in that:

the light condensing structures (1) are arranged at the rear end of the condenser, namely at LED light source end;

the end face contour curve of the end, close to a lens, of the cut-off line forming structure 2 is in an arc shape, and the cut-off line forming structure 2 is disposed at the front end of the condenser;

the SEG10 luminance reducing structure 5 is a protrusion with a sloped section and is disposed at the bottom of the condenser, and light shining on the SEG10 luminance reducing structure 5 is made to correspond to a legally-required SEG10 test zone of a low-beam light shape, so that the luminance of the SEG10 zone is prevented from being too high;

the zone III forming structure 4 is disposed at the bottom of the condenser, located at the front end of the SEG10 luminance reducing structure 5, and used for forming the breadth of the low-beam light shape and reducing the luminance of a test point HV of the light shape in zone III; and the 50L dark area forming structure 3 is disposed at the bottom of the condenser and makes the luminance of a 50L area in the low-beam light shape controllable.

According to the invention, each light condensing structure 1 is provided with an LED light source at the center of the rear end. Most light converged by the light condensing structures 1 is emitted out from the front end face of the cut-off line forming structure 2 to form the breadth of the low-beam light shape. Light shining on the 50L dark area forming structure 3 is weakened after being reflected and refracted by the 50L dark area forming structure 3, so that the luminance of a 50L test point of the low-beam light shape is reduced. Light shining on the zone III forming structure 4 forms zone III for the low-beam light shape. Light shining on the SEG10 luminance reducing structure 5 is weakened after being reflected and refracted, and thus the luminance of the SEG10 test zone of the low-beam light shape is reduced.

According to the invention, the end face contour curve of the end, close to the lens, of the cut-off line forming structure 2 is preferably in the shape of an inward-concave or outward-convex arc perpendicular to and/or parallel with the light direction, so that a cut-off line at an angle of 15° or 45° is formed.

According to the invention, the 50L dark area forming structure 3 is preferably disposed at the bottom of the condenser, located between the zone III forming structure 4 and the cut-off line forming structure 2, and perpendicular to the light spreading direction, namely low-beam irradiation forms a triangular protrusion in the axial direction.

The SEG10 luminance reducing structure is one main characteristic of the invention. When the condenser is applied to the low-beam vehicle light module, the light source efficiency is generally over 50% and even can approximate to 60%. As LEDs are arranged dispersedly, no fan is needed, and the heat dissipation effect is good. To make full use of the high efficiency of the condenser and the excellent heat dissipation performance of the LED light sources, the luminous flux output of low-beam light is generally over 1000 lm. If the structure is not particularly made to reduce the luminance of the legally-required SEG10 test zone, the luminance of the legally-required test zone is high and will be legally determined to be unqualified. In order to reduce the luminance of the SEG10 zone of the low-beam light shape to below 12,300 cd, a light shield is traditionally used to shield part of light. Compared with the traditional method, the structure for reducing the luminance of the SEG10 zone can be directly and easily disposed on the condenser of the invention, and a good effect which is mainly embodied in a more uniform light shape is achieved.

The condenser for the low-beam vehicle light module of the invention is characterized in that:

the zone III breadth forming structure 4-1 has, on the whole, a width of 10-15 mm and a height of 0.3-0.7 mm, and light passing through the zone III breadth forming structure 4-1 forms the breadth of the zone III; and in order to diffuse light to make the luminance of zone III meet the regulatory requirements, the front end face of the zone III breadth forming structure 4-1 is in the shape of an arc with a small radius R of 5-10 mm.

The condenser for the low-beam vehicle light module of the invention is characterized in that the HV luminance reducing structure 4-2 is a triangular or polygonal protrusion for reducing HV luminance.

Preferably, the front end, facing the condenser, of the zone III breadth forming structure 4-1 is in an inward-concave arc shape.

The condenser for the low-beam vehicle light module of the invention is characterized in that:

the HV luminance reducing structure 4-2 is located at a middle front position of the zone III breadth forming structure 4-1;

the HV luminance reducing structure 4-2 is located in the middle of the zone III breadth forming structure 4-1, which means that the HV luminance reducing structure 4-2 is located at the inward-concave arc bottom of the zone III breadth forming structure 4-1; and the HV luminance reducing structure 4-2 is located on the front portion of the zone III breadth forming structure 4-1, which means that compared with the breadth forming structure 4-1, the HV luminance reducing structure 4-2 is closer to the front portion of the condenser.

In addition, according to the invention, the included angle between the HV luminance reducing structure 4-2 and the lower bottom surface of the zone III breadth forming structure 4-1 (namely the surface, abutting against the SEG10 luminance reducing structure 5, of the zone III breadth forming structure 4-1) is an obtuse angle.

According to the invention, the included angle between the HV luminance reducing structure 4-2 and the front end face of the zone III breadth forming structure 4-1 (namely the tangent line of an inward-concave arc surface at the joint of the HV luminance reducing structure 4-2 and the zone III breadth forming structure 4-1) is an acute angle.

Part of the effective light emitted by the LED light sources shines on front center inlet structures 1-1, and the other part of the effective light shines on lateral center inlet structures 1-2. The light shining on the front center inlet structures is refracted by the front center inlet structures and then enters the condenser.

Each front center inlet structure 1-1 is disposed at the inner front end of the center of the corresponding light condensing structure 1 and is made from the same material, such as transparent plastic or resin, with the condenser. Light emitted by the LED light sources is refracted by the front center inlet structures and then shines into the condenser.

The condenser for the low-beam vehicle light module of the invention is characterized in that:

the zone III forming structure 4 comprises a zone III breadth forming structure 4-1 and an HV luminance reducing structure 4-2;

the front end of the zone III breadth forming structure 4-1 is in an arc shape, the rear end of the zone III breadth forming structure 4-1 is in the shape of a sheet connected with the front end of the SEG10 luminance reducing structure 5; and the HV luminance reducing structure 4-2 is a triangular or polygonal protrusion for reducing the HV luminance.

Most light shining on the zone III forming structure 4 is emitted out from the front end face of the zone III breadth forming structure 4-1 to form the breadth of the low-beam light shape. The other small part of the light shines on the HV luminance reducing structure 4-2 and is reflected and refracted by the HV luminance reducing structure 4-2, and thus the luminance of a test point HV of the light shape in zone III is reduced.

According to the invention, the luminance of the test point HV of the light shape in zone III is reduced and has a great allowance while meeting the regulatory requirements.

As is shown in FIG. 11, HV is a test point on a light distribution screen and is the intersection point of a line H-H (the horizontal axis) and a line V-V (the longitudinal axis), namely the original point (0, 0).

The condenser for the low-beam vehicle light module of the invention is characterized in that:

the zone III breadth forming structure 4-1 has, on the whole, a width of 10-15 mm and a height of 0.3-0.7 mm, and light passing through the zone III breadth forming structure 4-1 forms the breadth of the zone III;

the front end face of the zone III breadth forming structure 4-1 is in the shape of an arc with a small radius R of 5-10 mm; and the front end face of the zone III breadth forming structure 4-1 is in the shape of an arc with a small radius, so that the luminance of zone III meets the regulatory requirements.

The condenser for the low-beam vehicle light module of the invention is characterized in that the HV luminance reducing structure 4-2 is located at a middle front position of the zone III breadth forming structure 4-1. The included angle between the HV luminance reducing structure 4-2 and the lower bottom surface of the zone III breadth forming structure 4-1 is an obtuse angle. The included angle between the HV luminance reducing structure 4-2 and the front end face of the zone III breadth forming structure 4-1 is an acute angle.

In this way, light shining on the HV luminance reducing structure 4-2 is refracted, so that the original light path is changed to prevent light from shining on point HV in the low-beam zone III and the area near point HV, and the luminance of point HV is reduced accordingly.

The middle front position is shown in FIG. 7 and FIG. 8 which are bottom views of the condenser. The HV luminance reducing structure 4-2 is located in the middle of the arc surface of the front end of the zone III breadth forming structure 4-1. The bottom surface and the front end face are shown in FIG. 9. The included angles are shown in FIG. 10.

The condenser for the low-beam vehicle light module of the invention is characterized in that:

The section, in the light direction of the condenser, of the SEG10 luminance reducing structure 5 is in the shape of an obtuse triangle, and the two angles, connected with the bottom surface of the condenser, of the SEG10 luminance reducing structure 5 are acute angles;

light shining on the SEG10 luminance reducing structure 5 corresponds to the SEG10 zone of the low-beam light shape; and part of the light shining on the SEG10 luminance reducing structure 5 is emitted out from the front end face of the cut-off line forming structure 2 after being totally reflected, and the other part of the light is emitted out of the condenser after being directly or repeatedly refracted.

According to the invention, part of the light shining on the SEG10 luminance reducing structure 5 is emitted out from the front end face of the cut-off line forming structure 2 after being totally reflected, and the other part of the light is emitted out of the condenser instead of being emitted out from the front end face of the cut-off line forming structure 2 after being directly or repeatedly refracted.

According to the invention, light emitted out from the front end face of the cut-off line forming structure 2 forms the SEG10 zone of the low-beam light shape. The luminance of the SEG10 zone of the low-beam light shape is below 12,300 cd.

The condenser for the low-beam vehicle light module of the invention is characterized in that skin lines are formed on the surface of the SEG10 luminance reducing structure 5 and used for scattering light shining on the surface of the SEG10 luminance reducing structure 5 and consuming light energy to reduce energy in the SEG10 zone of the low-beam light shape.

According to the invention, the skin lines are preferably formed on the surface of the SEG10 luminance reducing structure 5 and used for reducing the energy in the SEG10 zone of the low-beam light shape to reduce the luminance of the SEG10 zone to below 12,300 cd.

The condenser for the low-beam vehicle light module of the invention is characterized in that the condenser installation structures 6 are disposed on two sides of the condenser, and the number of the light condensing structures is two or more.

The condenser for the low-beam vehicle light module of the invention is characterized in that the lower side face of the condenser is an inward-concave arc face or a plane and is provided with a left part and a right part having a height difference therebetween in the light condensing direction, a boundary between the left part and the right part, having the height difference therebetween, on the lower side face of the condenser (1) is located in the middle of the lower side face of the condenser (1) in the light condensing direction, and the height difference is 0.4-0.6 mm.

The condenser for the low-beam vehicle light module of the invention is characterized in that the zone III forming structure 4 on the lower side face of the condenser (1) is a platy protrusion stretching across the boundary between the left part and the right part, having the height difference therebetween, on the lower side face of the condenser (1), and the lower side face of the protrusion is an inward-concave arc shape.

The condenser for the low-beam vehicle light module of the invention is characterized in that the SEG10 luminance reducing structure 5 stretches across the boundary between the left part and the right part, having the height difference therebetween, on the lower side face of the condenser (1), and the surface of the SEG10 luminance reducing structure 5 is also provided with a left part and a right part having a height difference therebetween.

The condenser for the low-beam vehicle light module of the invention is characterized in that each condenser installation structure 6 comprises two screw holes used for fixedly installing the condenser and rectangular guide grooves used for pre-positioning the condenser, wherein the screw holes are formed in the two sides of the condenser separately, the guide grooves are also formed in the two sides of the condenser separately, and positioning ribs used for accurately positioning the condenser are disposed in the screw holes.

The condenser for the low-beam vehicle light module of the invention is characterized in that the condenser is made from transparent plastic or resin such as LC1500 PC.

The condenser for the low-beam vehicle light module of the invention is characterized in that:

each light condensing structure 1 comprises a front center inlet structure 1-1, a lateral center inlet structure 1-2 and a reflecting structure 1-3, wherein, the front center inlet structure 1-1 is disposed at the inner front end of the center of the light condensing structure 1, the reflecting structure 1-3 is located at the tail end of the condenser and disposed on the outer side of the light condensing structure 1 and is conical;

the lateral center inlet structure 1-2 is disposed on the inner side of the light condensing structure 1 and connects the front center inlet structure 1-1 with the reflecting structure 1-3; and light emitted by the corresponding LED light source is spread forwards after being refracted by the front center inlet structure 1-1 and the lateral center inlet structure 1-2 and totally reflected by the reflecting structure 1-3.

As is shown in FIG. 1, the inward-concave faces of the light condensing structures 1 are formed by the corresponding front center inlet structures 1-1 and the corresponding lateral center inlet structures 1-2. The front center inlet structures 1-1 are the front end faces of the corresponding inward-concave faces, and the lateral center inlet structures 1-2 are the lateral wall faces of the corresponding inward-concave faces.

In addition, the shape of the front center inlet structures 1-1 is different from that of the lateral center inlet structures 1-2. Each front center inlet structure 1-1 is an arc surface with a circular boundary. Each lateral center inlet structure 1-2 is a conical and cylindrical arc surface with two arc-shaped end boundaries. The front center inlet structures 1-1 and the lateral center inlet structures 1-2 have the same essential effect of refracting light emitted by the LED light sources into the condenser. However, light refracted by the front center inlet structures 1-1 will not shine onto the reflecting structures, but light refracted by the lateral center inlet structures 1-2 shines onto the reflecting structures 1-3 and then is totally reflected by the reflecting structures 1-3.

According to the condenser for the low-beam vehicle light module of the invention, the section of each reflecting structure 1-3 is in an outward-convex arc shape, and the tail end of each reflecting structure 1-3 is provided with a bowl-shaped light inlet groove backing onto the emitting direction of the corresponding LED light source.

The arc-shaped section of each lateral center inlet structure 1-2 is provided with irregular arc lines.

Each front center inlet structure 1-1 is disposed at the inner front end of the center of the corresponding light condensing structure 1. The front center inlet structures 1-1 and the condenser are all made from transparent plastic or resin such as LC1500 PC. Light emitted out by the LED light sources is refracted by the front center inlet structures 1-1 and then enters the condenser.

According to the condenser for the low-beam vehicle light module of the invention, the HV luminance reducing structure 4-2 is located at the middle front position of the zone III breadth forming structure 4-1. The included angle between the HV luminance reducing structure 4-2 and the lower bottom surface of the zone III breadth forming structure 4-1 is an obtuse angle, and the included angle between the HV luminance reducing structure 4-2 and the front end face of the zone III breadth forming structure is an acute angle, so that light shining on the HV luminance reducing structure 4-2 is refracted, the original light path is changed to prevent light from shining on the point HV in the low-beam zone III and the area near the point HV, and the luminance of the point HV is reduced accordingly.

The HV luminance reducing structure 4-2 is another main characteristic of the invention. Although the luminance of the point HV can be smaller than the maximum value 625 cd specified by laws and regulations, the allowance is small; and along with the increase of the luminous flux of the light sources, the stability becomes poor, and the luminance of the point HV can be increased and legally determined to be unqualified. By adoption of the HV luminance reducing structure, it is ensured that the luminance of the point HV is below 625 cd.

According to the condenser for the low-beam vehicle light module of the invention, the 50L dark area forming structure 3 is a triangular protrusion structure perpendicular to the light spreading direction and preferably is an isosceles triangle with the base angles of 10°-20°. More preferably, the 50L dark area forming structure 3 is an isosceles triangle with the base angles of 15°.

The 50L dark area forming structure can prevent dazzling while ensuring sufficient low-beam illumination, and thus a driver in the opposite direction can drive normally without being affected.

The invention has the following beneficial effects:

the condenser integrates all optical elements other than the lens with all condenser parts, thereby being smaller in spatial size and greatly improving space utilization efficiency.

The optical elements are integrated, so that positional accuracy between optical functional components is ensured, and position errors caused by assembling are avoided.

The number of parts is small, and cost is low.

The SEG10 luminance reducing structure is disposed on the condenser to reduce the luminance of the SEG10 zone in the low-beam light shape, and a special luminance reducing light shield is not needed, so that parts are saved, and the structure is simple.

The HV luminance reducing structure is additionally arranged, making the luminance of the point HV in the low-beam light shape lower and more stable and achieving a greater allowance for legal judgments.

In the FIGS.: 1, light condensing structure; 2, cut-off line forming structure; 3, 50L dark area forming structure; 4, zone III forming structure; 5, SEG10 luminance reducing structure; 6, condenser installation structure; 1-1, lateral center inlet structure; 1-2, front center inlet structure; 1-3, reflecting structure; 4-1, zone III breadth forming structure; 4-2, HV luminance reducing structure.

DETAILED DESCRIPTION OF THE INVENTION

The invention is further described as follows in combination with the drawings and specific embodiments.

Embodiment

Figure 1:
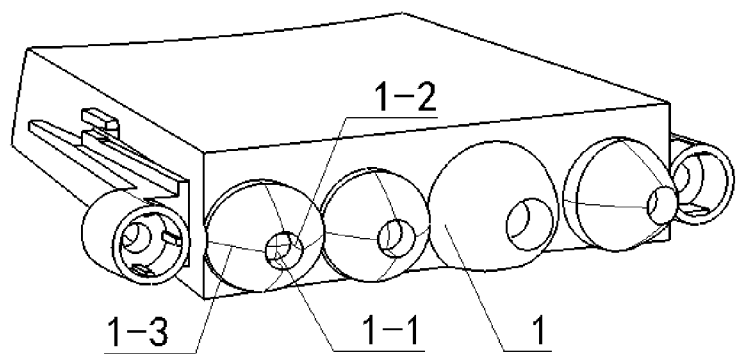
FIG. 1 is a first spatial structural diagram of a condenser for a low-beam vehicle light module of the invention.
Figure 2:
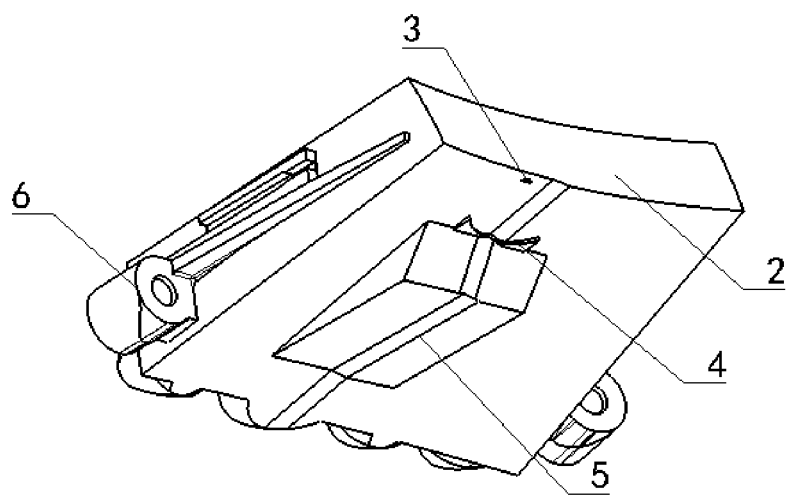
FIG. 2 is a second spatial structural diagram of the condenser for the low-beam vehicle light module of the invention.

As is shown in FIG. 1 and FIG. 2, the embodiment of the invention provides a condenser for a low-beam vehicle light module, which is used for low-beam illumination of vehicles and disposed in the headlamps of the vehicles. The condenser comprises light condensing structures 1, a cut-off line forming structure 2, a 50L dark area forming structure 3, a zone III forming structure 4, an SEG10 luminance reducing structure 5 and condenser installation structures 6. The condenser has, on the whole, a length of about 65 mm, a width of about 50 mm and a height of about 10 mm and is made from transparent plastic or resin. In the specific embodiment, the condenser is made from PC and has a refractivity of 1.586-1.587.

The light condensing structures 1 are disposed at the rear end of the condenser. The cut-off line forming structure 2 is disposed at the front end of the condenser. The SEG10 luminance reducing structure 5 is disposed at the bottom of the condenser. The zone III forming structure 4 is disposed at the bottom of the condenser and located at the front end of the SEG10 luminance reducing structure. The 50L dark area forming structure 3 is disposed at the bottom of the condenser and located between the zone III forming structure 4 and the cut-off line forming structure 2. The condenser installation structures 6 are disposed at the two sides of the condenser, and the number of the light condensing structures 1 is 4.

An LED light source is disposed at the center of the rear end of each light condensing structure 1. Most light converged by the light condensing structures 1 is emitted out from the front end face of the cut-off line forming structure 2 to form the breadth of a low-beam light shape. Light shining on the 50L dark area forming structure 3 is weakened after being reflected and refracted by the 50L dark area forming structure 3, and thus the luminance of a 50L test point of the low-beam light shape is reduced. Light shining on the zone III forming structure 4 forms a zone III for the low-beam light shape. Light shining on the SEG10 luminance reducing structure 5 is weakened after being reflected and refracted, and thus the luminance of the SEG10 test zone of the low-beam light shape is reduced.

Figure 4:
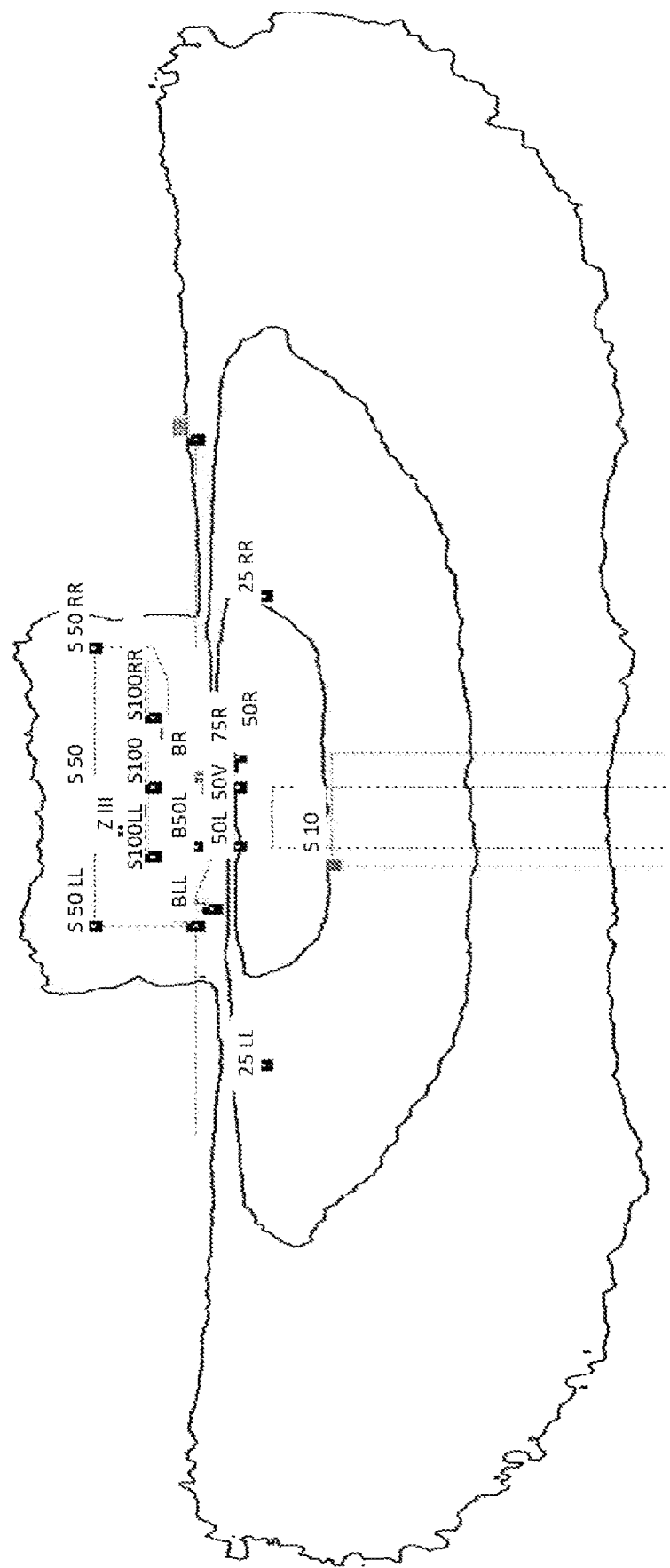
FIG. 4 is a diagram of a low-beam light shape formed by the condenser for the low-beam vehicle light module of the invention.

The four LED light sources have a luminous flux of 750 lm and a luminous flux of 250 lm. The LED with the maximum luminous flux of 750 lm is disposed in the middle of the condenser, two LEDs with the luminous flux of 250 lm are disposed on the left, and the other LED with the luminous flux of 250 lm is disposed on the right side. FIG. 4 shows the low-beam light shape. The low-beam output is about 1000 lm, and the luminance is about 55 lx.

Each light condensing structure 1 comprises a front center inlet structure 1-1, a lateral center inlet structure 1-2 and a reflecting structure 1-3, wherein the front center inlet structure 1-1 is disposed at the inner front end of the center of the light condensing structure 1, the reflecting structure 1-3 is disposed on the outer side of the light condensing structure 1, and the lateral center inlet structure 1-2 is disposed on the inner side of the light condensing structure 1 and connects the front center inlet structure 1-1 with the reflecting structure 1-3. The LED light sources are disposed at the center of the rear end of the light condensing structures 1. Light emitted by the low-beam LED light sources is spread forwards after being refracted by the front center inlet structures 1-1 and the lateral center inlet structures 1-2 and totally reflected by the reflecting structures 1-3.

Figure 3:
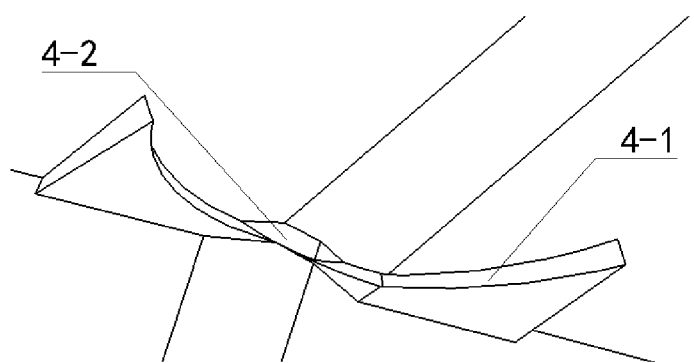
FIG. 3 is a spatial structural diagram of a zone III forming structure of the condenser for the low-beam vehicle light module of the invention.

As is shown in FIG. 3, the zone III forming structure 4 comprises a zone III breadth forming structure 4-1 and an HV luminance reducing structure 4-2. Most light shining on the zone III forming structure 4 is emitted out from the front end face of the zone III breadth forming structure 4-1 to form the breadth of the low-beam light shape. The other small part of the light shines on the HV luminance reducing structure 4-2 and is reflected and refracted by the HV luminance reducing structure 4-2, so that the luminance of the test point HV of the light shape in the zone III is reduced and has a great allowance while meeting the regulatory requirements.

The zone III breadth forming structure 4-1 has, on the whole, a width of 12 mm and a height of 0.5 mm. Light passing through the zone III breadth forming structure 4-1 forms the breadth of the zone III. In order to diffuse light to make the luminance of the zone III meet the regulatory requirements, the front end face of the zone III breadth forming structure 4-1 is in the shape of an arc with a small radius R of 7 mm. The transverse breadth range of the zone III is −10°~+10°, and the longitudinal breadth range of the zone III is +7°.

The HV luminance reducing structure 4-2 is located at a middle front position of the zone III breadth forming structure 4-1. The included angle between the HV luminance reducing structure 4-2 and the lower bottom surface of the zone III breadth forming structure 4-1 is an obtuse angle, and the included angle between the HV luminance reducing structure 4-2 and the front end face of the zone III breadth forming structure 4-1 is an acute angle, so that light shining on the HV luminance reducing structure 4-2 is refracted, the original light path is changed to prevent light from shining on the point HV of the zone III and the area near the point HV, and the luminance of the point HV is reduced accordingly. Simulation test results show that the luminance of the point HV is about 0.2 lx.

Figure 5:
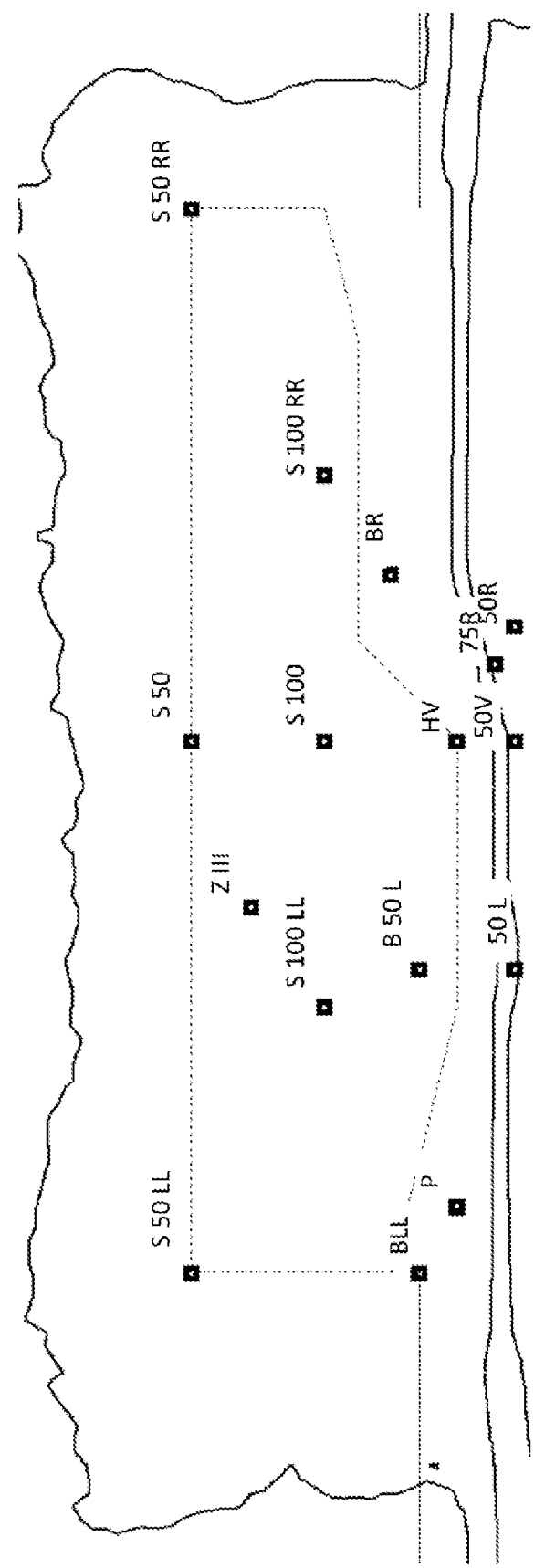
FIG. 5 is a diagram of a zone III light shape formed by the condenser for the low-beam vehicle light module of the invention.

The light shape formed in the zone III is shown in FIG. 5.

Figure 6:
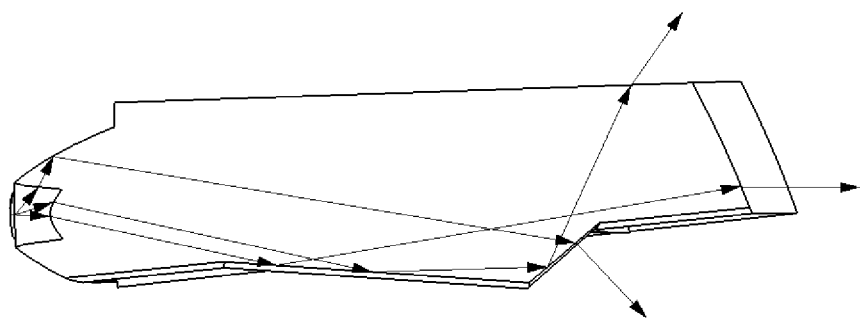
FIG. 6 is a diagram of the light direction on an SEG10 luminance reducing structure in the condenser for the low-beam vehicle light module of the invention.
Figure 7:
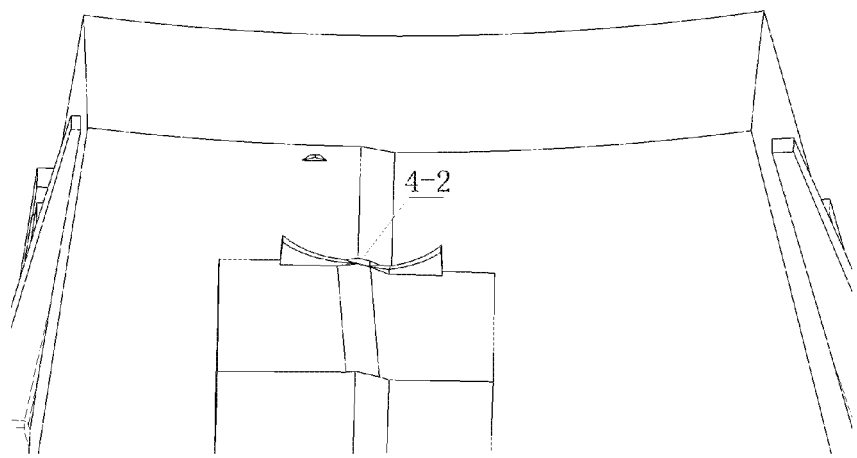
FIG. 7 is an arrangement view of an HV luminance reducing structure 4-2 of the zone III forming structure of the condenser for the low-beam vehicle light module of the invention.
Figure 8:
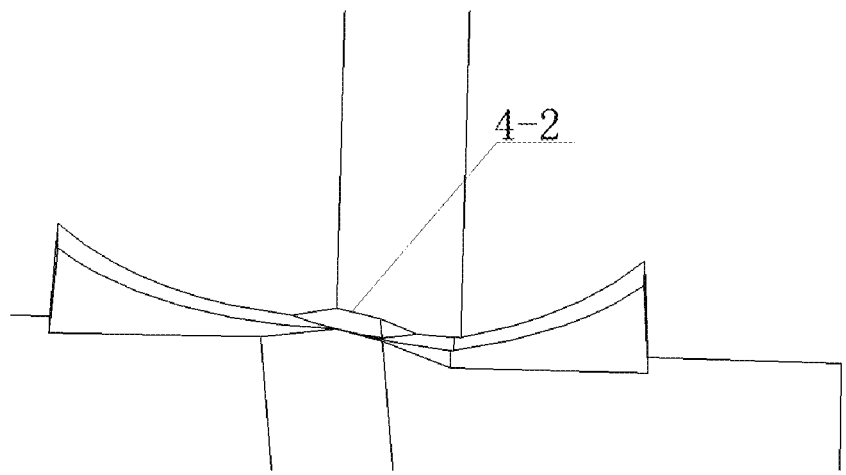
FIG. 8 is an enlarged arrangement view of the HV luminance reducing structure 4-2 of the zone III forming structure of the condenser for the low-beam vehicle light module of the invention.
Figure 9:
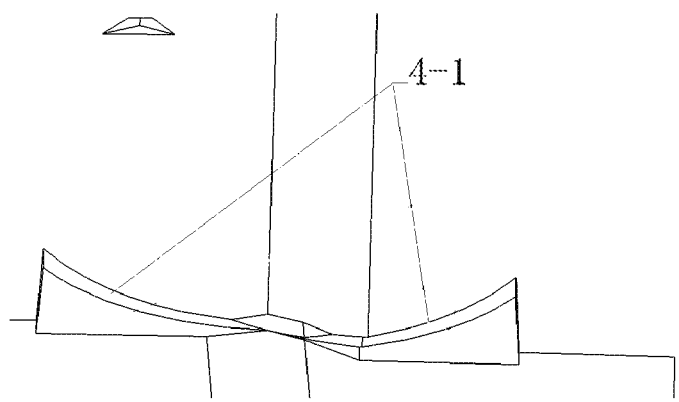
FIG. 9 is an arrangement view of a zone III breadth forming structure 4-1 and the HV luminance reducing structure 4-2 of the zone III forming structure of the condenser for the low-beam vehicle light module of the invention.
Figure 10:
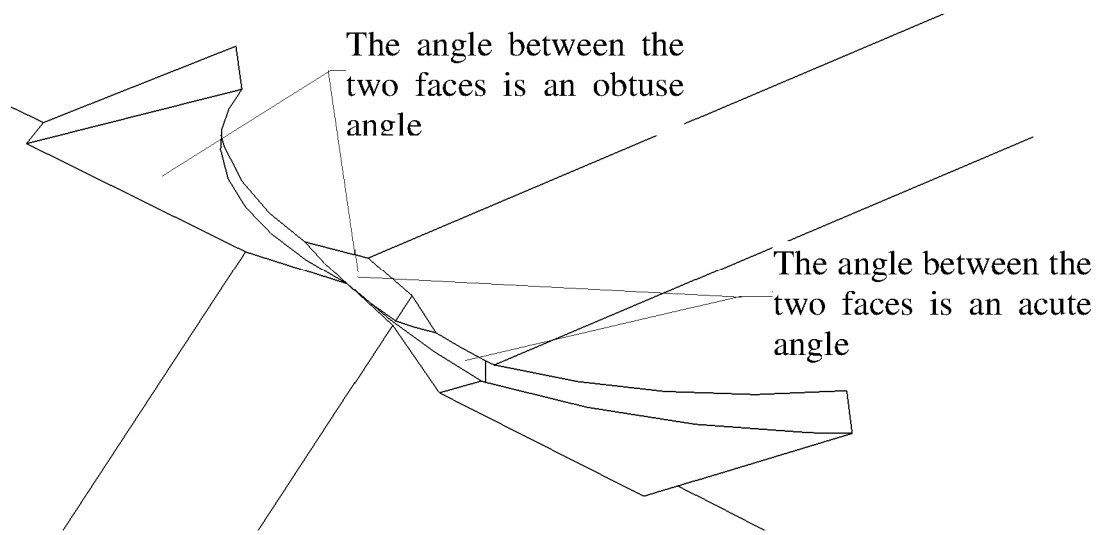
FIG. 10 is an enlarged view of FIG. 9.
Figure 11:
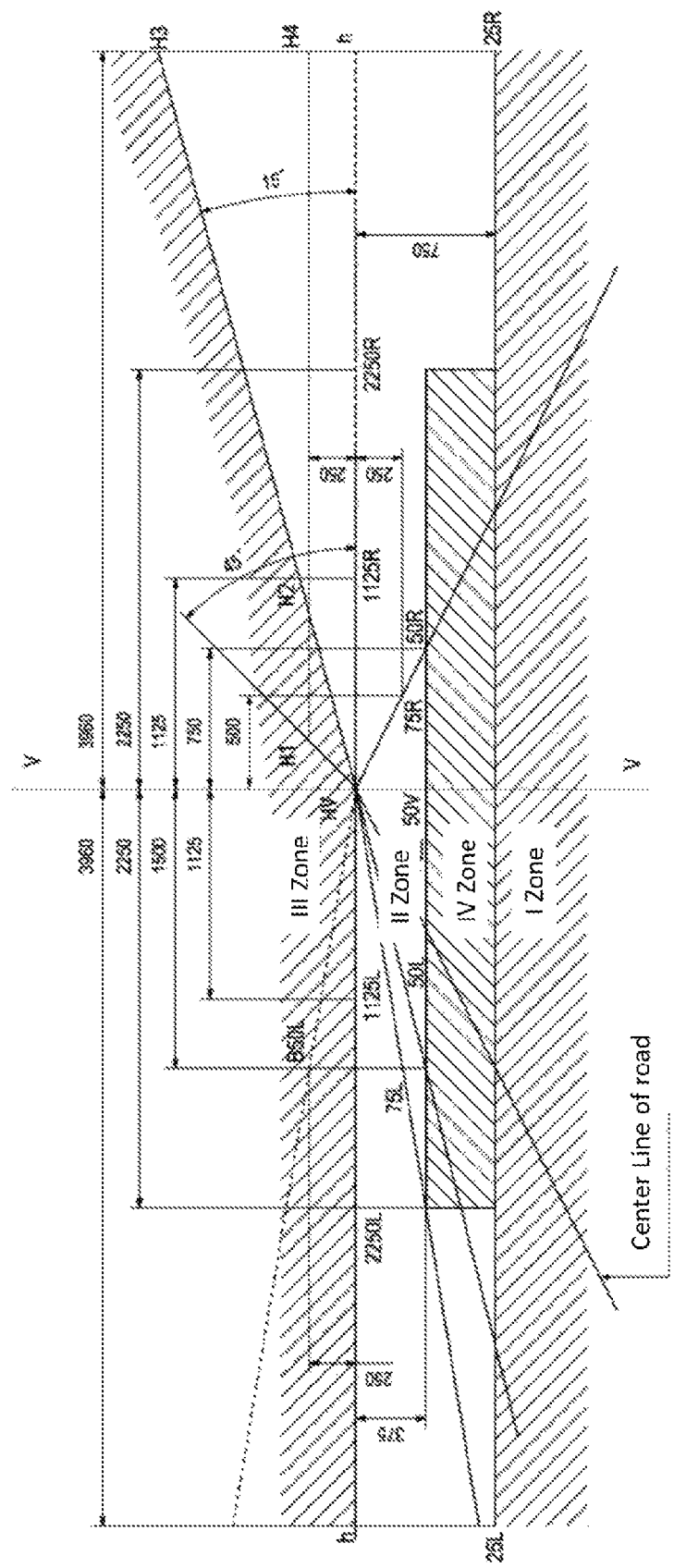
FIG. 11 is a diagram of an HV luminance test point.
Figure 12A:
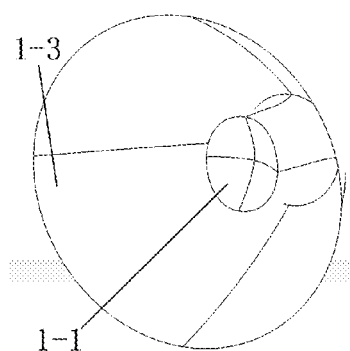
FIG. 12A a diagrams of a light condensing structure of the condenser of the invention.
Figure 12B:
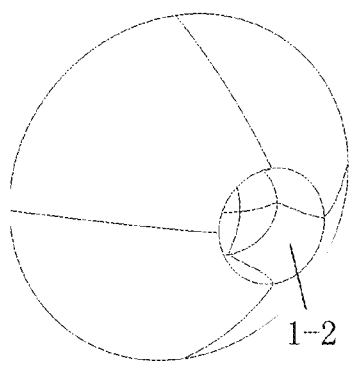
FIG. 12B is a different view of FIG. 12A.

As is shown in FIG. 6, the section of the SEC10 luminance reducing structure 5 is in the shape of an obtuse triangle, and the two angles, in contact with the bottom surface of the condenser, of the SEC10 luminance reducing structure 5 are acute angles. The SEC10 luminance reducing structure 5 is, on the whole, 35 mm long, 20 mm wide and 6.5 mm high. Light shining on the SEG10 luminance reducing structure 5 corresponds to the SEG10 zone of the low-beam light shape. Part of the light shining on the SEG10 luminance reducing structure 5 is emitted out from the front end face of the cut-off line forming structure 2 after being totally reflected. The other part of the light is emitted out of the condenser instead of being emitted out from the front end face of the cut-off line forming structure 2 after being refracted directly or repeatedly. Light emitted out from the front end face of the cut-off line forming structure 2 forms the SEG10 zone of the low-beam light shape, and the luminance of the SEG10 zone is below 12300 cd.

In this embodiment, the luminance of the SEG10 test zone in the low-beam light shape is about 9800 cd and meets the regulatory requirements of ECE R123 Class C, V and E.

Each condenser installation structure 6 comprises two screw holes used for fixedly installing the condenser and rectangular guide grooves used for pre-positioning the condenser. The screw holes are separately formed in the two sides of the condenser, and the guide grooves are also separately formed in the two sides of the condenser. Positioning ribs used for accurately positioning the condenser are disposed in the screw holes. In the module, the condenser is positioned and installed on a radiator.

The condenser of the invention integrates all optical elements other than the lens with all condenser parts, thereby improving space utilization efficiency, ensuring positional accuracy between optical functional components, eliminating positioning errors, and having a low cost.

What is claimed is:

1. A condenser for a low-beam vehicle light module, comprising light condensing structures (1), a cut-off line forming structure (2) disposed at a front end of the condenser, namely the end close to a lens and condenser installation structure (6), and 50L dark area forming structure (3), wherein
the light condensing structures (1) are disposed at a rear end of the condenser, namely an LED light source end;
the light condensing structures (1) comprises a front center inlet structure (1-1), a lateral center inlet structure (1-2) and a reflecting structure (1-3);
the front center inlet structure (1-1) is disposed at the inner front end of the center of the light condensing structure (1),
the reflecting structure (1-3) is located at the tail end of the condenser and disposed on the outer side of the light condensing structure (1) and is conical;
the lateral center inlet structure (1-2) is disposed on the inner side of the light condensing structure (1) and connects the front center inlet structure (1-1) with the reflecting structure (1-3);
the cut-off line forming structure (2) has an end, with an arc-shaped end face contour curve, close to the lens and is disposed at a front end of the condenser; and
the 50L dark area forming structure (3) is disposed at the bottom of the condenser and makes luminance of a 50L area in the low-beam light shape controllable.

2. The condenser for the low-beam vehicle light module according to claim 1, comprising
zone Ill forming structure (4),
the zone Ill forming structure (4) is disposed at the bottom of the condenser to forms a breadth of the zone Ill and reduce HV luminance of the zone Ill.

3. The condenser for the low-beam vehicle light module according to claim 2, comprising
a lower side face of the condenser is an inward-concave arc face or a plane and is provided with a left part and a right part having a height difference there between in the light condensing direction, a boundary between the left part and the right part, having the height difference there between, on the lower side face of the condenser (1) is located in a middle of the lower side face of the condenser (1) in the light condensing direction, and the height difference is 0.4-0.6 mm.

4. The condenser for the low-beam vehicle light module according to claim 3, comprising
the zone Ill forming structure (4) on the lower side face of the condenser (1) is a platy protrusion stretching across the boundary between the left part and the right part, having the height difference there between, on the lower side face of the condenser (1), and a lower side face of the protrusion is an inward-concave arc shape.

5. The condenser for the low-beam vehicle light module according to claim 2, comprising
the zone Ill forming structure (4) comprises a zone Ill breadth forming structure (4-1) and an HV luminance reducing structure (4-2);
the zone Ill breadth forming structure (4-1) has, on the whole, a width of 10-15 mm and a height of 0.3-0.7 mm, and light passing through the zone Ill breadth forming structure (4-1) forms a breadth of the zone Ill; and
in order to diffuse light to make luminance of the zone Ill meet regulatory requirements, a front end face of the zone Ill breadth forming structure (4-1) is in a shape of an arc with a small radius R of 5-10 mm;
the HV luminance reducing structure (4-2) is a triangular or polygonal protrusion for reducing HV luminance.

6. The condenser for the low-beam vehicle light module according to claim 5, comprising
HV luminance reducing structure (4-2),
the HV luminance reducing structure (4-2) is located at a middle front position of the zone Ill breadth forming structure (4-1);
the HV luminance reducing structure (4-2) is located in a middle of the zone Ill breadth forming structure (4-1), which means that the HV luminance reducing structure (4-2) is located at an inward-concave arc bottom of the zone Ill breadth forming structure (4-1); and
the HV luminance reducing structure (4-2) is located on a front portion of the zone Ill breadth forming structure (4-1), which means that compared with the breadth forming structure (4-1), the HV luminance reducing structure (4-2) is closer to a front portion of the condenser.

7. The condenser for the low-beam vehicle light module according to claim 6, comprising
SEG10 luminance reducing structure (5),
the SEG10 luminance reducing structure 5 is a protrusion with a sloped section and is disposed at the bottom of the condenser, and light shining on the SEG10 luminance reducing structure 5 is made to correspond to a legally-required SEG10 test zone of a low-beam light shape, so that the luminance of the SEG10 zone is prevented from being too high.

8. The condenser for the low-beam vehicle light module according to claim 7, comprising
the SEG10 luminance reducing structure (5) is in a shape of an obtuse triangle, and two angles, connected with a bottom surface of the condenser, of the SEG10 luminance reducing structure (5) are acute angles;
light shining on the SEG10 luminance reducing structure (5) corresponds to the SEG10 zone of the low-beam light shape; and
part of the light shining on the SEG10 luminance reducing structure (5) is emitted out from a front end face of the cut-off line forming structure (2) after being totally reflected, and the other part of the light shining on the SEG10 luminance reducing structure (5) is emitted out of the condenser after being directly or repeatedly refracted.

9. The condenser for the low-beam vehicle light module according to claim 7, comprising skin lines are formed on a surface of the SEG10 luminance reducing structure (5) and used for scattering light shining on the surface of the SEG10 luminance reducing structure (5) and consuming light energy to reduce energy in the SEG10 zone of the low-beam light shape.

* * * * *